May 30, 1967 E. H. WOLFE 3,322,004
METHOD OF FABRICATING STEEL RULE DIES
Filed Nov. 17, 1965
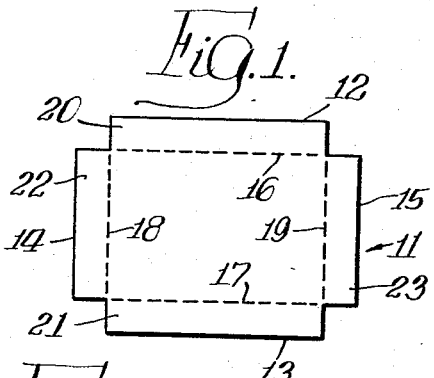
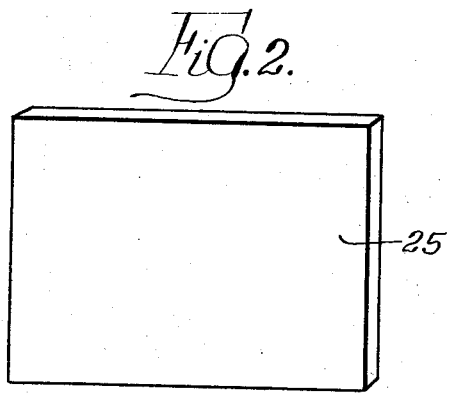
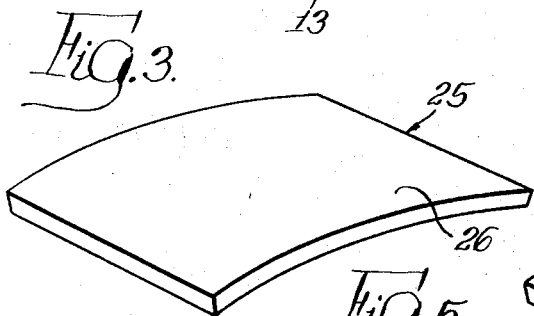
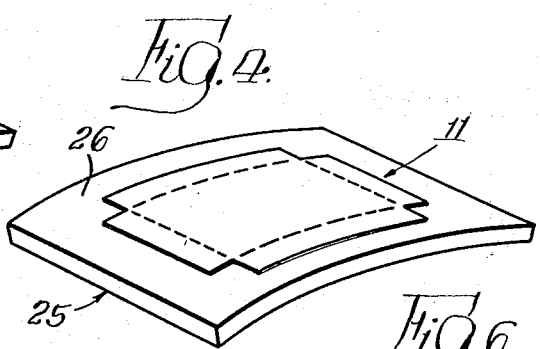
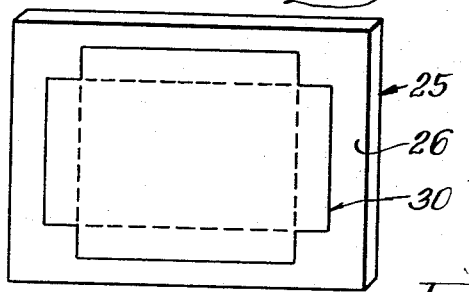
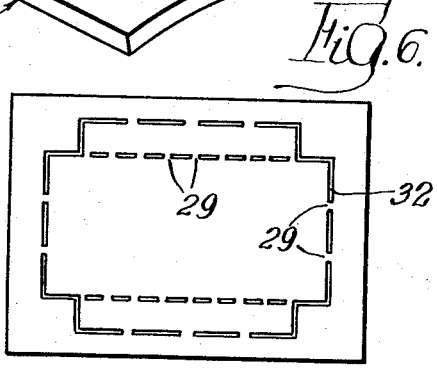
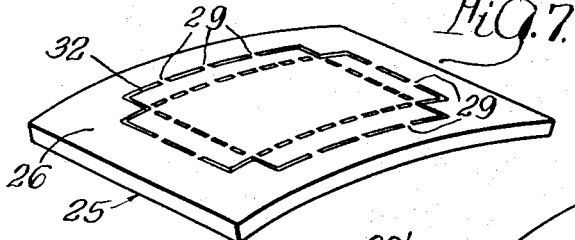
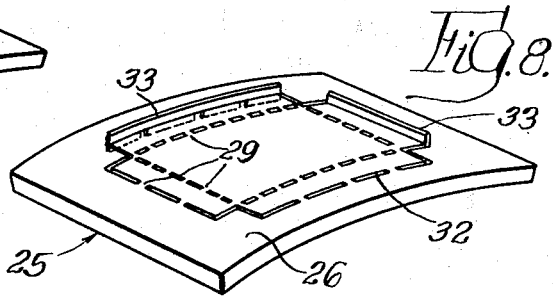
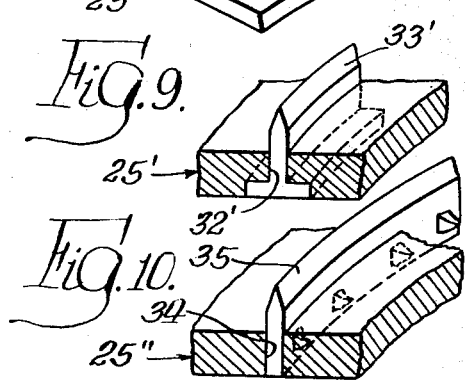
Inventor:—
Edgar H. Wolfe,
By Brown, Jackson, Boettcher & Dienner
Attys.

United States Patent Office 3,322,004
Patented May 30, 1967

3,322,004
METHOD OF FABRICATING STEEL RULE DIES
Edgar H. Wolfe, Winnetka, Ill., assignor to The Barrett Bindery Co., Chicago, Ill., a corporation of Illinois
Filed Nov. 17, 1965, Ser. No. 508,338
5 Claims. (Cl. 76—107)

The present invention relates to methods of fabricating die plates such as steel rule dies for performing cutting, scoring, embossing and like operations.

In the prior art it has been wide spread practice to provide so-called flat die plates for the purposes above noted. However, the use of such flat die plates are limited and are not adaptable for high speed production as may be achieved with a curved die plate mounted on a rotatable cylinder.

In the known flat die plates, no particular difficulties are encountered in providing accurate alignment and positioning of the steel rules embedded therein for a desired pattern in view of the fact that the rules are readily mounted in fixed positions with respect to each other in a flat or horizontal plane. However, in adapting steel rules with respect to a curved surface difficulties are encountered in maintaining accurate alignment for distortion free positioning of the working edges of the steel rules for a desired pattern due to unavoidable increase in dimension of the surface of a flat base after it has been cured. It is accordingly the object and purpose of the present invention to provide a method of making a curved steel rule die in which the working edges of the steel rules are disposed in predetermined relationship with respect to each other so that when applied by rotation thereof to the material to be cut, scored, or the like, such cutting or scoring of a desired pattern is free of distortion and will be of the same character as if cut or scored by a flat die plate.

A further object and purpose of the present invention is to provide for mounting of steel rules on a cylinder supported base member to provide for positioning of rules in fixed positions with respect to each other affording a high degree of dimensional stability of the steel rules.

Preferred embodiments of the invention are hereinbelow described in connection with the accompanying drawings in which:

FIGURE 1 is a plan view of a template defining a desired pattern to be cut, scored or the like on material such as paperboard for forming a box;

FIGURE 2 is a plan view of a base member for the die of the invention;

FIGURE 3 is a view of the base member of FIGURE 2 which has been temporarily curved to the radius of a rotatable cylinder on which the completed die is to be mounted;

FIGURE 4 illustrates the base member for the die of FIGURE 3 with the pattern or template of FIGURE 1 traced or applied to the outer surface of the base member;

FIGURE 5 illustrates the base member of FIGURE 4 returned or straightened to a flat plane with the traced pattern on the upper outer surface thereof;

FIGURE 6 illustrates the base member of FIGURE 5 in which the traced lines of FIGURE 5 have been recessed as by being grooved or slotted;

FIGURE 7 illustrates the base member of FIGURE 6 permanently curved to the radius of the base member as shown in FIGURE 3;

FIGURE 8 shows some of the steel rules serving as cutting, scoring or like members mounted in the recesses of the base member of FIGURE 7;

FIGURE 9 is a view of one form of steel rule of a construction for use in forming the curved steel rule die of the invention; and FIGURE 10 is a view of a second form of steel rule of the present invention.

Referring now to the drawings there is shown in FIGURE 1 a plan view of a template 11 defining a desired pattern for a steel rule die. The template 11 may be formed of any substantially inextensible but flexible material, such as paper. In the instance shown the template 11 may be that for a simple box structure. The template 11 for that purpose has edges 12, 13, 14 and 15 as indicated by the full lines along which box material is to be cut, and dotted lines as indicated at 16, 17, 18 and 19 at which the box material is to be scored to provide flap portions for a box as indicated at 20, 21, 22 and 23, respectively, of the pattern.

In FIGURE 2 there is shown a base member 25 for the die of the present invention. The base member 25 may be composed of plywood, plastic, metal such as aluminum or other suitable material characterized by being formable into arcutate configuration and subsequently to be set in a fixed curved configuration. For this purpose, and by way of example, plywood impregnated with a suitable thermosetting compound may be employed so that, as will appear below, upon curving of the base member to a fixed curvature the thermosetting material may be set by suitable heat treatment to cause the base member to assume a permanent curved configuration.

In practicing the method of the present invention the base member 25 is temporarily curved as shown in FIGURE 3 to a curvature of predetermined radius corresponding to the radius of a cylinder for carrying the die and operating it to cut, score or otherwise fabricate material into a desired pattern. With the base member 25 temporarily curved to the predetermined radius indicated, the template 11 of FIGURE 1 is applied or layed upon the upper outer surface 26 of the temporary curved base member 25 and the template then traced to apply the pattern thereof to the outer surface of the curved base member 25. After applying the pattern of the template 11 to the outer curved surface of the base member 25, the base member 25 as shown in FIGURE 5 is then straightened out to its original flat plane. As shown in FIGURE 5 the traced pattern 30 appears thereon. With the base member 25 now in a flat plane, the base member 25 is formed with recesses at the trace lines, as indicated at 32, to provide for the receiving or mounting of desired forms of steel rules in such recesses. The recesses 32 when of the form of slots extending through or partially through the base are interrupted at selected portions as typically indicated at 34 so that the base member remains integral. In the event the recesses 32 are in the form of grooves the latter may be continuous.

After forming the recesses 32 the base member 25 is then again curved as illustrated in FIGURE 7 to the curvature of the aforementioned predetermined radius for mounting on a cylinder for carrying the die. As before indicated, the base member 25 may be made of any suitable material permitting it to be permanently curved to the position shown, as for example, the aforementioned thermosetting impregnating of plywood material. After curving of the base member steel rule dies for cutting or scoring or otherwise working material into a desired pattern, such as indicated at 33, are mounted in the recesses of the base member. The rules 33 when embodied in slots in the base member may bridge the portions 29 to provide continuous working edges. The steel rules 33 when embodied in recesses in the form of grooves may be simple blade members frictionally mounted from the upper surface of the base into such grooves. The curved steel rule die is thus completed and may then be mounted in any suitable manner on a rotatable cylinder for effecting the die cutting or scoring or otherwise working of material to provide the pattern afforded by the template 11.

It will be understood that the steel rules 33 may constitute cutting, scoring, perforating or embossing steel rule members depending upon the desired requirements for the pattern to be formed from suitable material such as paperboard for a cardboard box or any other cutting, scoring, perforating or embossing of material to provide the material in pattern form as may be desired.

If desired the base member 25 rather than being permanently fixed in a predetermined curved position may be retained in such position by its mounting on a cylinder for fabricating material into the desired pattern.

Referring now to FIGURE 9, there is shown a base member 25' in which the recesses 32' are slots of inverted T-shape configuration for receiving a steel rule 33' having a base portion and an upright portion conforming to the inverted T-shaped recess formed in the base member 25'. This assembly of a steel rule formed of a cross-section conforming to the cross section of the recess formed in the base member provides for the snug and rigid support of the steel rule in the base member.

In FIGURE 10 the base member 25" is formed with a simple slot 34 into which a steel rule 35 formed with serrations along the lower edge thereof affording biting engagement of the serrations with an adjacent wall of the slot 34 to snugly and securely mount the steel rule 35 in the base member 25".

It will be apparent that various modifications and arrangements of steel rules may be provided with varying forms of means therefor for securely mounting the dies in the base member of the die. It will be understood that the rules may be of materials other than steel and that the term "steel rules" as in the jargon of the trade means rules of any suitable material for performing operations as aforenoted.

While there has been shown and described certain preferred embodiments of the invention, it will be understood that various modifications and rearrangements may be made therein without departing from the spirit and scope of the invention.

The invention claimed is:

1. The method of making a steel rule die comprising the steps of curving a base member for the die to a curvature of predetermined radius corresponding to the radius of a cylinder for carrying the die, inscribing a desired die pattern on a surface of said curved base member, straightening said base member to lie in a substantially flat plane, forming recesses in said base member conforming to the inscribed pattern on said surface thereof, again curving said base member to a curvature of said predetermined radius for mounting on said cylinder, and inserting steel rules in said recesses of said base member.

2. The method of claim 1 in which the desired die pattern is inscribed on the outer curve surface of the temporarily curved base member by conforming a flexible flat template of said desired die pattern upon and tracing the same on said outer surface of said temporarily curved base member, and in which after forming of said recesses in said base member permanently curving said base member to the curvature of said predetermined radius.

3. The method of claim 2 characterized by forming said recesses of said die pattern with enlarged openings at the inner surface of said base member and in which said steel rules having bases conforming to and engaging in the openings of said recesses.

4. The method of claim 2 characterized by applying steel rules having projections at their lower edges into biting engagement with the recesses in said base member.

5. The method of claim 2 characterized by forming said recesses in said base member of substantially inverted T-shape in cross-section extending upwardly from the lower to the outer surfaces of said base member, and in which said steel rules are of cross-section conforming to said recess openings for snug reception therein.

No references cited.

GRANVILLE Y. CUSTER, JR., *Primary Examiner*.